Jan. 22, 1935.  E. GERMAIN  1,988,894
AUTOMOBILE ANTIGLARE LIGHTING SYSTEM
Filed Jan. 5, 1933   3 Sheets-Sheet 1
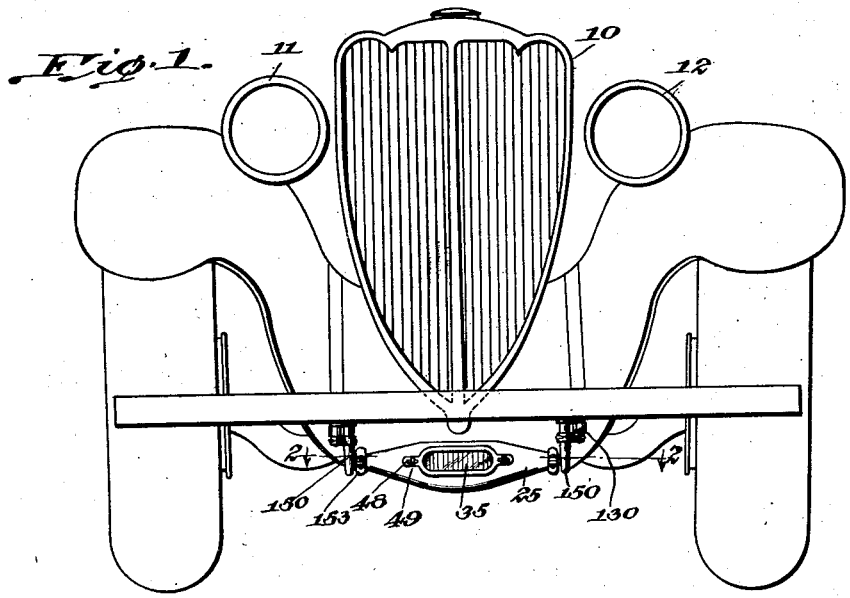
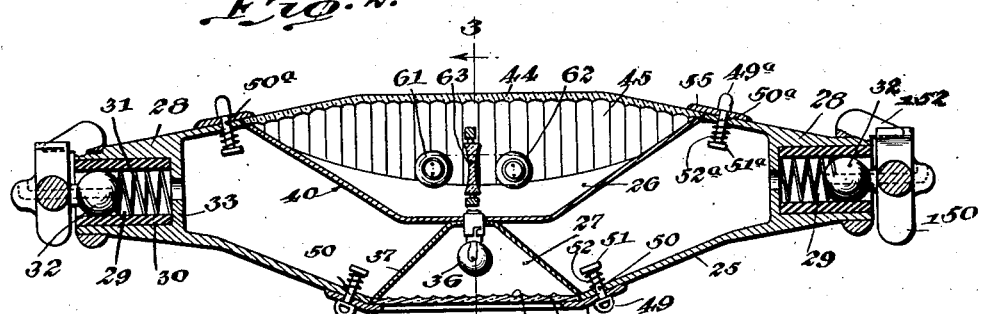
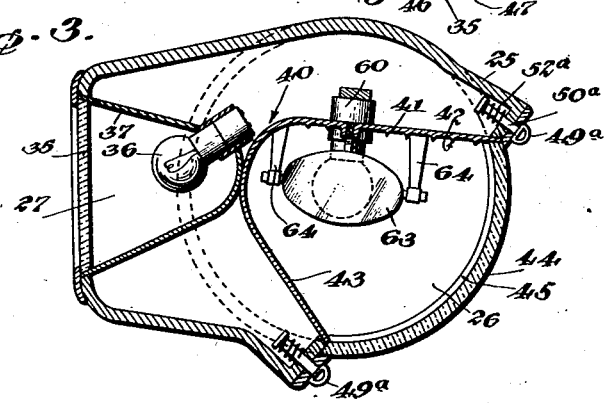
INVENTOR
Ernest Germain,
BY
ATTORNEYS
WITNESS Jan. 22, 1935.  E. GERMAIN  1,988,894
AUTOMOBILE ANTIGLARE LIGHTING SYSTEM
Filed Jan. 5, 1933  3 Sheets-Sheet 2
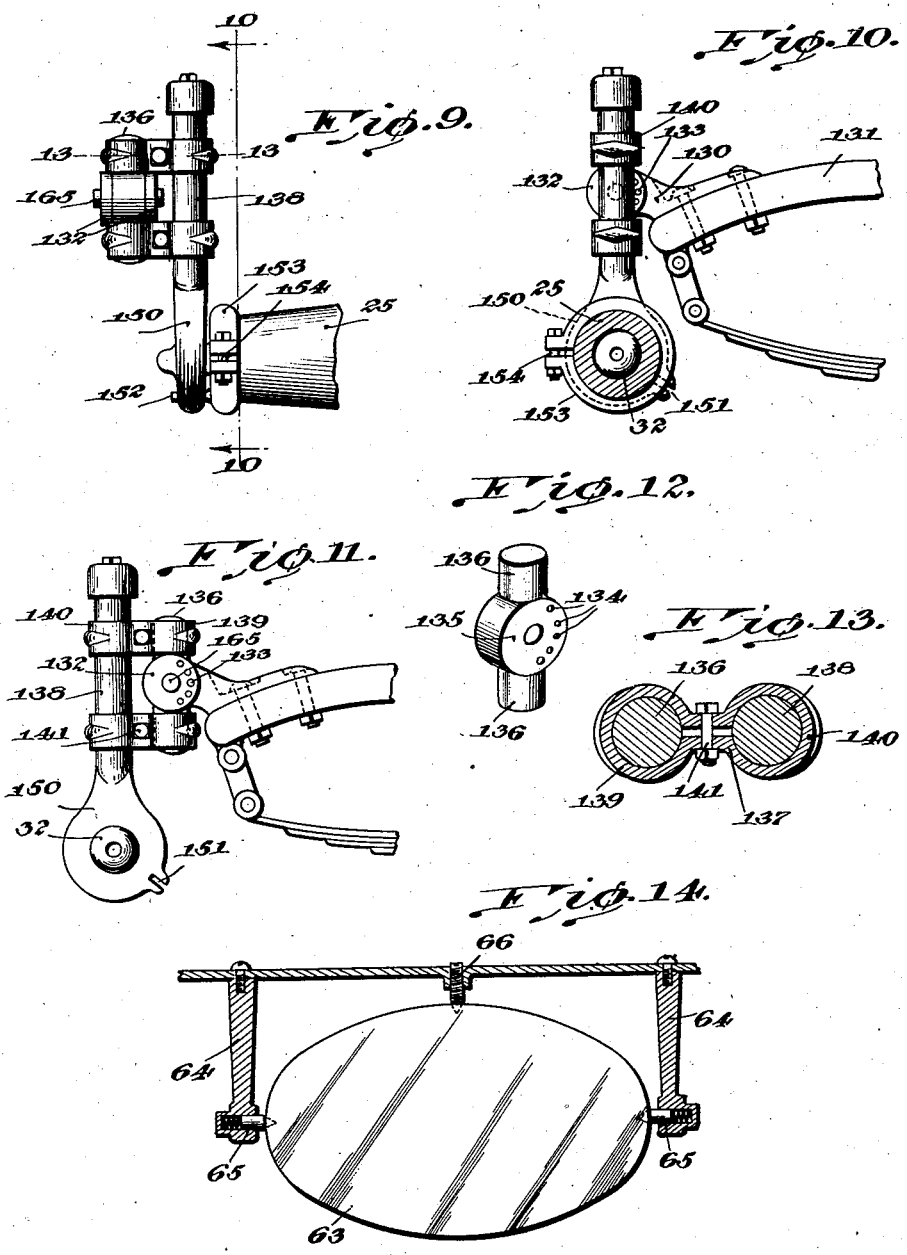
INVENTOR
Ernest Germain,
BY
ATTORNEYS Jan. 22, 1935. E. GERMAIN 1,988,894
AUTOMOBILE ANTIGLARE LIGHTING SYSTEM
Filed Jan. 5, 1933 3 Sheets-Sheet 3
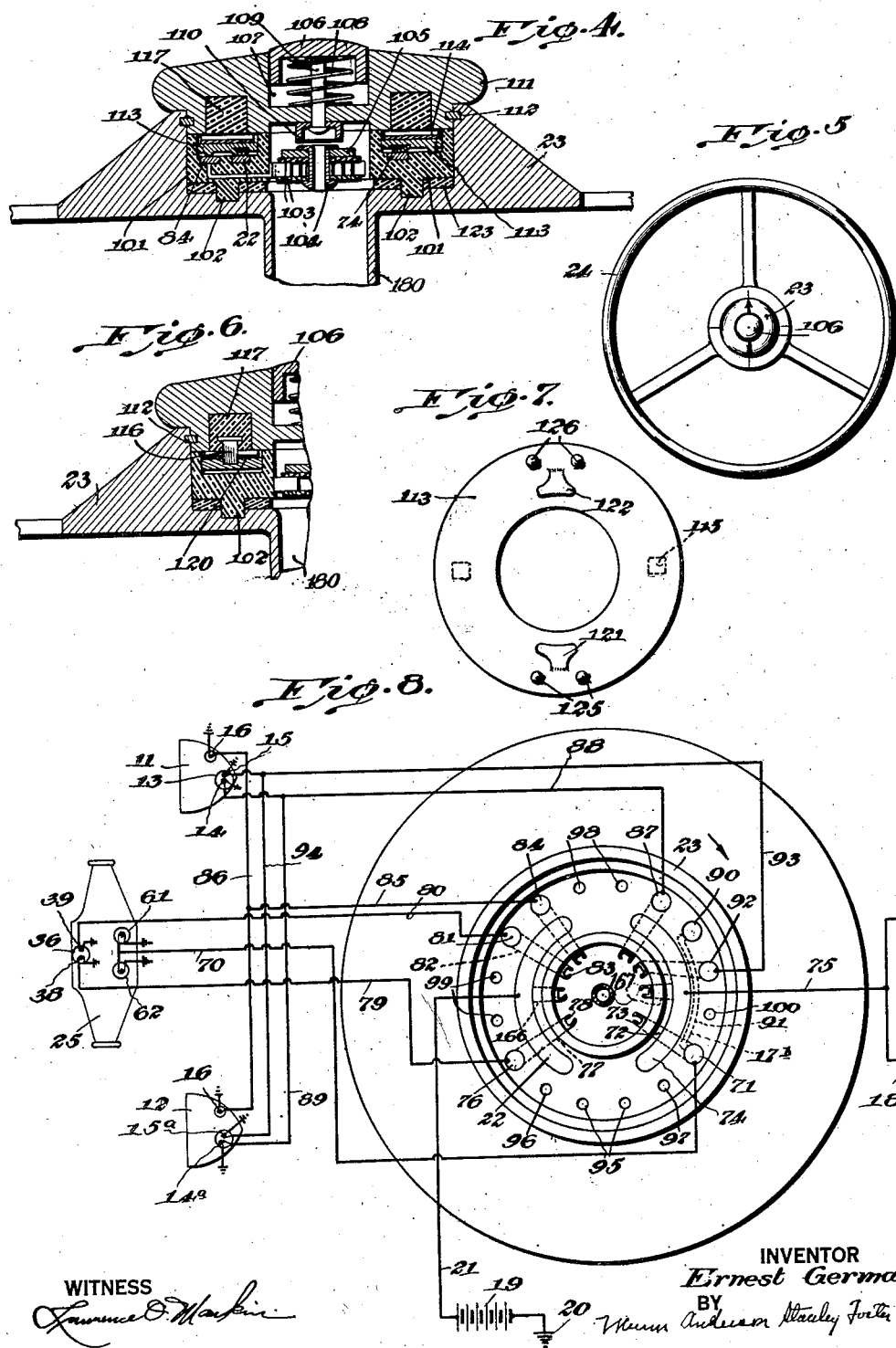
INVENTOR
Ernest Germain Patented Jan. 22, 1935

1,988,894

UNITED STATES PATENT OFFICE 1,988,894

AUTOMOBILE ANTIGLARE LIGHTING SYSTEM

Ernest Germain, Montreal, Quebec, Canada

Application January 5, 1933, Serial No. 650,343

5 Claims. (Cl. 240—7.1)

This invention relates to an automobile antiglare lighting system of the type described and claimed in my Patent No. 1,818,126, dated August 11, 1931.

An object of the invention is the provision of a lamp carried by the underframe of an automobile which is adapted to project an inverted light abreast of the wheels by means of a low angle reflector in connection with magnified filaments of incandescent lamps.

Another object of the invention is the provision of a lamp carried by the underframe of an automobile having a pilot lamp for directly projecting a beam of light into the path of the car and below the usual headlights, the pilot lamp being conjointly operated with a flood light illuminating the base of the wheel and controlled by a switch which controls the pilot and dim filaments of the pilot light in connection with the bright and dim filaments of the headlights.

A further object of the invention is the provision of a lamp carried below the usual headlights for counteracting the luminous and frosty effect of modern lenses in headlight mirrors thereby guiding the view of approaching motorists to the less intensified and illuminated aspect of the wheels which are brought into relief through the inverted projected rays of the lamp.

A still further object of the invention is the provision of an auxiliary lighting system in connection with the usual headlights but located below said headlights for projecting a low distant beam of light, broadly illuminating the path of the car, thereby aiding in avoiding hazards of the road, the rays being projected close to and in parallel relation with the surface of the roadbed so that the beam will penetrate the fog to provide instant traffic relief at dark intersections or on the streets or roads where a large number of cars are closely following each other.

A still further object of the invention is the provision of a lighting system for an automobile including an auxiliary lamp located below the usual headlights for illuminating the wheels and roadbed adjacent the wheels and including a controlling switch for simultaneously bringing into play respectively the dim and bright filaments of the headlights and the auxiliary lighting system, the switch being located in a convenient place on the steering wheel.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 is a front view in elevation of an automobile showing my improved lamp applied thereto, Figure 2 is a vertical section taken along the line 2—2 of Figure 1, Figure 3 is a transverse vertical section taken along the line 3—3 of Figure 2, Figure 4 is a vertical section of a switch embodied in the steering column, Figure 5 is a plan view of the steering column showing the switch applied thereto, Figure 6 is an enlarged vertical section of the switch taken at right angles to the section shown in Fig. 4, Figure 7 is a plan view of a contact carrying ring, Figure 8 shows more or less diagrammatically the electric circuit embodied in the lighting system, Figure 9 is an enlarged fragmentary front view in elevation of means for supporting the light on a frame of an automobile, Figure 10 is a vertical section taken on the line 10—10 of Figure 9, Figure 11 is a side view of the supporting brackets for the lamp shown in a different position from that disclosed in Figures 9 and 10, Figure 12 shows a universal pivot pin for the bracket, Figure 13 is a horizontal section taken along the line 13—13 of Figure 9, and Figure 14 is an enlarged vertical section of the magnifying glass located between a pair of lamps in the lamp housing.

Referring more particularly to the drawings, 10 designates an automobile having the usual headlights 11 and 12. The headlight 11 is provided with a lamp 13 having a filament 14 to provide the illumination of lower intensity and a filament 15 of higher intensity of the light. The lamp 12 has a filament 14$^a$ of low intensity and a filament 15$^a$ of high intensity.

The headlights 11 and 12 also are each provided with a lamp 16 for parking purposes.

Tail lights are indicated at 17 in Fig. 8. It will be noted that the filaments of all of these lamps are grounded in the usual manner.

A battery 19 is grounded at 20 and has a wire 21 leading to the curved metal bar 22 located within a cup 23 carried by the steering wheel 24.

Referring more particularly to Figures 1 to 3, inclusive, it will be seen that a metal housing 25 is divided into a rear compartment 26 and a front compartment 27. This housing is elongated and has its ends reduced, as shown at 28.

The reduced ends of the housing are provided with sockets 29 to receive a rubber sleeve 30, a spring 31 and a ball 32. The spring 31 engages the closed end 33 of the socket and also the ball 32 tending to move the ball outwardly of the socket. The sleeve 30 forms a cushion and embraces the ball 32.

The front chamber 27 is closed by a glass cover 35 which is fluted vertically. The cover of the rear chamber 26 is concavo-convex which in combination with the flutings of the glass cover and of the reflector provides a powerful yet economical flood light.

A lamp 36 is located at the rear of the chamber 27 and is embraced by a reflector 37. The lamp 36 is provided with a dim filament 38, shown in Figure 8, and a filament 39 for producing a bright light.

The chamber 26 is provided with a reflector generally designated by the numeral 40. The horizontal portion 41 is fluted, as shown at 42. A portion 43 extends downwardly at an angle and terminates adjacent the lower end of a curved cover 44 which is vertically fluted, as shown at 45 in Figure 2.

The glass 35 is also vertically fluted, as shown at 46 in Figure 2. The glass 35 is held in place by a cover plate 47 which is provided with an elongated slot 48 through which is inserted an elongated head 49 of a pin 50. A head 51 maintains a spring 52 in compressed relation between the head 51 and the inner face of the housing 25 so that when the head 49 is turned at right angles to the slot 48, the pin will retain the cover plate 47 in place.

A ring of metal 55 embraces the glass plate 44 adjacent its periphery and maintains the glass in position. This glass is held in place by means of a pin 50ª which is provided with an elongated head 49ª, a spring 52ª and a head 51ª. This construction is identical with the construction of the pin 50. This means of connecting the plate 47 and the ring 55 onto the housing 25 provides for cushioning the securing means for the plate and ring.

A pair of sockets 60 are formed in the top portion 41 of the reflector 40 and are adapted to support light bulbs 61 and 62.

Between these light bulbs is mounted a concavo-concave lens 63. The magnifying power of this lens causes the rays of each bulb to be considerably enlarged towards each other with such controlling effect that they are broadly and brightly reflected abreast of the vehicle from the low angle surfaces of the reflector ends. This construction also provides for the maintenance of proper illumination when one of the lamps fails.

Arms 64 are secured to the top portion 41 of the reflector 40, depend downwardly and are provided with spring-pressed lugs 65 having pointed ends engaging similarly formed pockets in the opposite ends of the lens 63 as shown in Figure 14. A screw 66 engages the upper edge of the lens 63 and maintains said lens in a vertical position.

Referring more particularly to Figures 4 to 8, inclusive, it will be seen that the lamps 61 and 62 are grounded and are connected to a wire 70 which extends to a contact member 71 located in the cup 23 which houses the switch and which is mounted at the center of the steering wheel 24.

The contact 71 is connected to a metal strip 72 extending inwardly to a clip 73. An arcuately-shaped contact member 74 similar to the contact member 22 is located adjacent the contact 71 and is connected by a wire 75 which leads to the tail lamps 17 and 18.

A contact 76, connected by a metal strip 77 with a clip 78, is connected by a wire 79 to the dim filament 38 of the lamp 36. A wire 80 connects the filament 39 which gives the illumination of high intensity with a contact 81 and this contact is connected by means of a metal strip 82 with a clip 83.

A contact 84 is connected by a wire 85 with a wire 86 which leads to the parking lamps 16 of the head lamps 11 and 12.

A contact 87 is connected by a wire 88 with the dim filament 14 of the lamp 11 while a wire 89 connects the dim filament 14ª of the lamp 12 with the wire 88 so that the dim filaments of the headlights are illuminated simultaneously.

A contact 90 is connected by a conductor 91 with the contact 71.

A contact 92 is connected by a wire 93 with the filament 15 of the headlight 11. A wire 94 connects the filament 15ª with the wire 93 so that the filaments which give the high intensity are simultaneously illuminated.

A plurality of perforations 95, 96, 97, 98, 99 and 100 are formed in an insulating ring 101 for a purpose which will be presently explained. This insulating ring is provided with lugs 102 seated within pockets formed in the bottom of the housing 23 for maintaining the ring against rotation. It will also be noted that the arcuately-shaped contacts 22 and 74 are imbedded in the insulating material of the ring 101 and the contacts 71, 76, 81, 84, 87, 90 and 92 are likewise imbedded in the ring 101. It will also be noted that each of these contacts just mentioned is connected by strips of metal to the various clips located centrally of the housing 23 and clamped between a pair of insulating discs 103 by means of a fastener 104. This fastener also retains a metal disc contact member 105 in position and this disc is connected by a wire to the usual horn or other signalling device of the vehicle.

A push button 106 is mounted in a pocket 107 and is maintained in an outward position by means of a spring 108. A plunger 109 is connected to the button 106 and a contact member 110 is connected to the plunger 109 so that as the button is moved in the contact 110 will engage the contact plate 105 for closing the circuit to the signal.

A dial or knob 111 is mounted in the upper end of the top and is held in place by means of a ring 112 seated within co-operating grooves within the dial 111 and the side wall of the cup or housing 23 so that the dial may be revolved while being maintained in a definite position within the housing 23.

A ring 113 is mounted in an annular chamber 114 and is provided with openings 115 adapted to receive pins 116 at diametrically opposite points carried by an insulating ring 117 secured within the inner portion of the dial 111. Thus it will be seen that if the dial 111 is revolved the ring 113 will likewise be revolved. A spring member 120 is located between the inner face of the dial 111 and the outer face of the ring 113 for maintaining the ring in flat contact with the bottom of the recess of chamber 114.

The ring 113 is formed of phospho-bronze and is provided with a pair of contacts 121 and 122 which are adapted to engage respectively the arcuately-shaped contact members 22 and 74 carried by the ring 101 which is mounted upon a ring 123 at the bottom of the housing 23. A pair of pins 125 are adapted to engage certain of the pockets 95 to 100 while pins 126 diametrically disposed from the pins 125 are adapted to engage certain of the pockets which are diametrically disposed to the pockets engaged by the pins 125 for maintaining the ring against rotation after the dial 111 has been revolved. The pins 125 and 126 are adapted to engage those contacts of the group designated by the numerals 71, 76, 81, 84, 90 and 92 which are in the line of travel of said pins.

The housing 25 is supported by the underframe at the front part of the vehicle and below the headlights 11 and 12. A bracket arm 130 is secured to the front end of each channel beam 131 of the chassis and extends forwardly and is provided with a pair of cylindrically-shaped ears 132 and these ears are provided with a plurality of perforations 133 adapted to be alined with a plurality of similarly formed passages 134 formed in a member 135 having outwardly projecting pins 136.

A pair of clamps, generally designated by the numeral 137, are supported by a rod 138 and the opposite ends 139 of the clamps receive the pins 136. The portions 140 of the clamps 137 embrace the rod 138 and these clamps are drawn up tight by means of the bolts 141.

It will be noted from Figs. 9, 10 and 11 that the clamps 137 may be extended in any radial direction from the rod 138.

At the lower end of the rod is provided an enlargement 150 and this rod is provided with a slot 151 adapted to receive a pin 152 projecting from a clamping ring 153 which is secured in place upon the end of the housing 25 by means of a bolt 154. Each ball 32 is connected to an adjacently mounted rod 138.

The operation of my device is as follows: The construction shown in Figs. 9 to 13, inclusive, provides a ready means for attaching the housing 25 to the underface of the automobile and also for connecting the housing without necessitating the changing of the size of the parts for the purpose since the clamp 137 may be swung in any position on the rods 138.

The discs 132 are connected to the enlargement or head 135 by means of the pin 165 and the angular position of the rod 138 may be varied by inserting a pin into various combinations of the alined perforations 133 and 134.

When the dial 111 is rotated and the pins 125 are located in the pockets 95 and the pins 126 are located in the pockets 98, the lighting system will be in neutral position. When the dial 111 is moved in the direction of the arrow in Figure 8, the contact member 122 will engage the arcuately-shaped contact 74 while one of the pins 126 will engage the contact 87, thereby closing the circuit to the dim lights 14 and 14ᵃ of the headlights 11 and 12, respectively, and since the arcuately-shaped member 74 is electrically connected to the arcuately-shaped member 22 through the metal disc 113 which is in turn connected to the battery 21, the circuit will be closed between any of the various wires and their respective contacts when either one of the arcuately-shaped members 22 and 74 are engaged by the members 121 and 122. It will be noted that a metal strip 166 extends from the contact 22 while a metal strip 167 extends from the contact 74. The clips at the inner ends of the strips are clamped in position for retaining the various contacts in position.

When the member 122 engages the contact 74 and the pins engage the contacts 87 and 90, the lamps 61 and 62 will be illuminated due to the fact that the wire 70 connects the lamps with the contact 71 which in turn is connected by metal strip 17ᵇ with the contact 90. At the same time the dim filaments of the headlights are illuminated by means of the wire 88 while the dim filament of lamp 36 is illuminated since one of the pins 125 will engage the notch 96 with the other pin engaging contact 76 thereby closing the circuit to the filament 38 by the wire 79 and the engagement of the member 121 with the arcuately-shaped member 22.

When the contacts 90, 92 and the contacts 74 and 76 are bridged the bright filaments 15 and 15ᵃ of the lamps 11 and 12 are illuminated, as are lamps 61 and 62 and the dim filament 38 of the lamp 36. When the contact 71 is engaged by a pin 126 and the member 122 engages the member 74 the lamps 61 and 62 are illuminated and the filament 39 of highest intensity of the pilot lamp 36 is illuminated since the member 121 engages the contact 22 while one of the pins 125 engages the contact 81. When, however, the dial is further rotated and the member 121 engages the contacts 22 and a pin 125 engages the contact 84 the parking lights 16 are illuminated together with the tail lights 17 and 18.

It will be noted that the housing 23 has a depending hollow stem 180 which projects down into the usual column of the steering wheel.

I claim:

1. In a lighting system for automobiles equipped with forwardly projecting headlights, a lamp housing positioned between and below said headlights, a pair of lamps in the housing, a reflector embracing said lamps for directing the rays from the lamps rearwardly upon the ground and upon the wheels of the automobile and a lens between the lamps, the axis of the lens being in line with the lamps, said lens dispersing the light rays from both lamps on the reflector.

2. In a lighting system for automobiles equipped with forwardly projecting headlights, a lamp housing positioned between and below said headlights, a pair of lamps in the housing, a reflector embracing said lamps for directing the rays from the lamps rearwardly upon the ground and upon the wheels of the automobile, a lens between the lamps, the axis of the lens being in line with the lamps, the housing having a rear window through which the rays are projected, and a vertically fluted transparent covering for the window, said lens dispersing light rays from both lamps on the reflector.

3. A lighting system for automobiles comprising a pair of forwardly projecting headlights, a lamp housing mounted between the forward extremities of the underframe, the housing being provided with an inverted and elongated window and a forward vertically disposed window, a pair of lamps in the inverted window and a lamp having varying intensities in the forward window, reflectors mounted in each window to cause light rays to project widely across the base of the wheels, and forwardly on a horizontal plane with the underframe to display an illuminated path abreast of the headlights.

4. A lighting system for automobiles having headlights comprising a lamp housing connected with the forward extremities of the underframe, the housing being provided with an inverted and elongated window and a forward vertically disposed window, a pair of lamps in the inverted window and a lamp having varying intensities in the forward window, reflectors mounted in each window to cause light rays to project widely across the base of the wheels and forwardly on a horizontal plane with the underframe and means for adjustably mounting the housing on the underframe so that the position of the windows may be varied around the longitudinal axis of the said housing.

5. In an automobile lighting system, an elongated lamp housing connected with the forward members of the underframe of the automobile, the housing having an enlarged central portion which tapers towards the ends of the housing, said housing being divided into a front and rear compartment, the outer face of the rear compartment being extended over the greater portion of the length of said housing, the outer face of the front compartment being restricted to the portion of greatest width of the housing, the rear and end walls of the compartments forming reflectors, and lamps in the compartments so that light rays will be projected forwardly and rearwardly but below a horizontal plane passing through the underframe.

ERNEST GERMAIN.